United States Patent [19]

Lannefors et al.

[11] Patent Number: 5,264,014

[45] Date of Patent: Nov. 23, 1993

[54] ARRANGEMENT FOR CLEANING VENTILATION AIR POLLUTED WITH PAINT PARTICLES

[75] Inventors: Hans Lannefors; Leif Lindau; Mikael Kihlbert, all of Växjö, Sweden

[73] Assignee: ABB Fläkt Aktiebolag, Stockholm, Sweden

[21] Appl. No.: 784,429

[22] PCT Filed: Apr. 23, 1990

[86] PCT No.: PCT/SE90/00268

§ 371 Date: Oct. 23, 1991

§ 102(e) Date: Oct. 23, 1991

[87] PCT Pub. No.: WO90/12649

PCT Pub. Date: Nov. 1, 1990

[30] Foreign Application Priority Data

Apr. 25, 1989 [SE] Sweden ................................ 8901494

[51] Int. Cl.⁵ .............................................. B03C 3/16
[52] U.S. Cl. ................................... 96/44; 55/DIG. 46; 454/54; 96/52; 96/77
[58] Field of Search .................... 55/7, 8, 10, 122, 240, 55/257.2, 257.3, 138, DIG. 46, 136; 261/112.1; 454/54

[56] References Cited

U.S. PATENT DOCUMENTS

| | | | |
|---|---|---|---|
| 2,245,516 | 6/1941 | Wintermute | 55/122 X |
| 4,351,652 | 9/1982 | Wisting | 55/240 X |
| 4,484,513 | 11/1984 | Napadow | 55/DIG. 46 |
| 4,687,686 | 8/1987 | Stofleth et al. | 55/DIG. 46 |
| 4,822,381 | 4/1989 | Mosley et al. | 55/138 X |
| 4,894,073 | 1/1990 | Andreae | 261/112.1 X |
| 4,955,990 | 9/1990 | Napadow | 55/DIG. 46 |
| 5,019,138 | 5/1991 | Farrah et al. | 55/240 X |
| 5,039,313 | 8/1991 | Gocht | 55/8 |

FOREIGN PATENT DOCUMENTS

| | | |
|---|---|---|
| 0047432 | 3/1982 | European Pat. Off. . |
| 0280360 | 8/1988 | European Pat. Off. . |
| 2344318 | 10/1977 | France . |
| 196718 | 6/1965 | Sweden . |
| 458831 | 5/1989 | Sweden . |

*Primary Examiner*—Richard L. Chiesa
*Attorney, Agent, or Firm*—Nils H. Ljungman & Associates

[57] ABSTRACT

An arrangement for cleaning ventilation air coming from a paint spray booth and polluted with paint particles is provided with a liquid flow for separating part of the paint particles from the ventilation air and a wet electrostatic precipitator for separating any remaining paint particles and liquid droplets from the ventilation air. The electrostatic precipitator is located in an enclosure underneath the floor of the spray booth, with a surface of the enclosure being poured over with the liquid flow to remove part of the paint particles. The enclosure is further designed so that the ventilation air from the spray booth is caused to be deflected through an angle of 10°–170° in relation to the substantially vertical direction of flow through the spray booth before passing through the liquid flow and into the electrostatic precipitator.

20 Claims, 1 Drawing Sheet

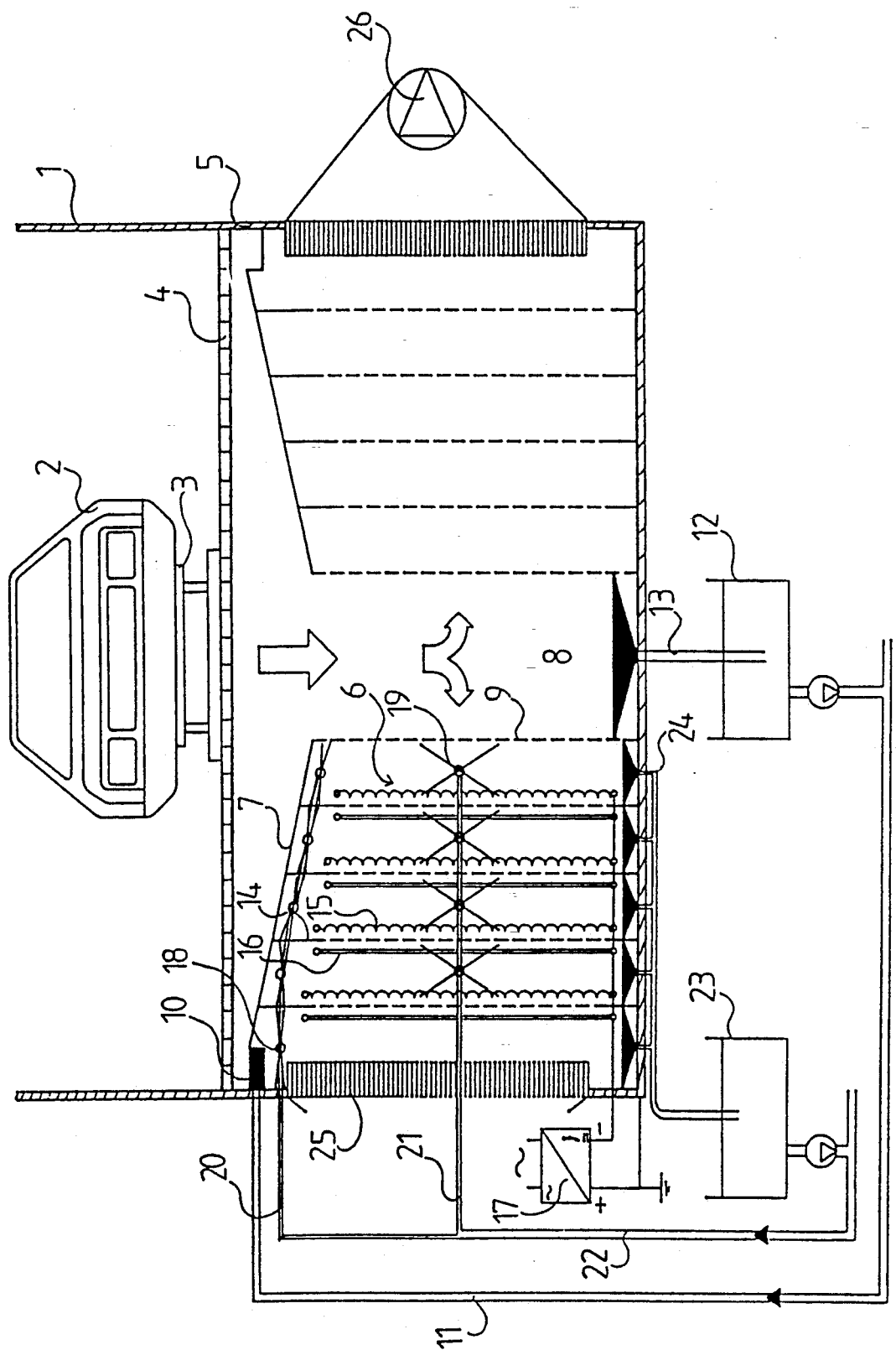

ARRANGEMENT FOR CLEANING VENTILATION AIR POLLUTED WITH PAINT PARTICLES

BACKGROUND OF THE INVENTION

1. Field of the Invention

The present invention relates to an arrangement for cleaning ventilation air coming from a spray booth for painting e.g. car bodies, and polluted with paint particles, comprising means for contacting the ventilation air with a liquid flow for separating part of the paint particles of the ventilation air, there being provided downstream of said means at least one wet electrostatic precipitator provided in an enclosure for separating the remaining particles as well as liquid droplets contained in the ventilation air and originating from said liquid flow.

2. Background Information

Venturi separators, so-called slot-type venturis, have been used for a long time for separating tacky paint particles from ventilation air coming from spray booths. In a venturi separator, the polluted ventilation air is accelerated and contacted at high velocity with a circulating flow of water which is divided into fine droplets, part of the paint particles colliding with the water droplets and being intercepted by them. See e.g. SE 196,718.

One drawback of venturi separators is that high-level noise is produced therein as the ventilation air passes through the venturi separator.

Another drawback inherent in venturi separators is that the ventilation air, in addition to residual paint particles, will contain water droplets, as well as solvents evaporated in the spray booth, after passing through the venturi separator.

In order that the objects, e.g. car bodies, which are painted in a spray booth should be provided with an acceptable surface layer, it is required, inter alia, that the ventilation air has a certain temperature and a certain relative humidity. Generally, the ventilation air is conditioned to about 23° C. and a relative humidity of 60-70%. This means that much energy is required in cold climatic zones for conditioning the ventilation air, if it is not recycled to the spray booth.

Since, as pointed out above, the ventilation air having passed through the venturi separator contains both paint particles and water droplets as well as solvents evaporated in the spray booth, it must be further cleaned if it should be recycled to the spray booth. Otherwise, these remaining paint particles and water droplets would have a devastating effect on the quality of the surface layer of the objects painted in the spray booth. If the painting operation should be carried out by human beings, it is also vital to remove the above-mentioned solvent vapours from the ventilation air.

SE 8601290-3, for instance, describes a method for recycling the major portion of the ventilation air to the spray booth. This is rendered possible by conducting the ventilation air leaving the venturi separator through an electrostatic precipitator operating according to the wet separation method, before recycling the ventilation air to the spray booth. This precipitator efficiently separates the particulate pollutants of the ventilation air, that is paint particles and water droplets, whereas not the solvent vapours contained therein. It is not necessary to remove the solvent vapours from the ventilation air if painting robots are used in the spray booth.

By recycling the ventilation air according to the above-mentioned method, the energy consumption of the painting plant is reduced. However, since a conventional venturi separator is still used, this method suffers from the above-mentioned drawback of having a high sound level, and the use of a further cleaning device in the form of an electrostatic precipitator involves extra installation and running costs for the painting plant.

DE 37 05 634 describes a method of cleaning polluted ventilation air from a spray booth by directly conducting it into a conventional electrostatic precipitator operating according to the wet separation method.

According to this prior art method, the venturi separator has thus been replaced by an electrostatic precipitator, which means that no annoying sound is produced and that efficient separation of the particulate pollutants in the ventilation air can be obtained theoretically. It would however be difficult to provide sufficient room for a conventional electrostatic precipitator in the space normally occupied by the venturi separator below a spray booth.

Since the electrostatic precipitator according to the last-mentioned patent specification is disposed directly below the floor grating of the spray booth, people working in the spray booth are in danger of coming into contact with high voltage components of the precipitator. The paint should therefore be applied by robots.

Locating the electrostatic precipitator as described above also constitutes a fire and explosion hazard.

OBJECT OF THE INVENTION

The object of present invention therefore is to provide a compact and efficient, non-noise producing, fire- and explosion-proof arrangement which is designed for cleaning ventilation air polluted with paint particles, and which can be installed in existing painting plants without necessitating any extensions thereof. This arrangement should also be usable in spray booths where painting is performed manually.

SUMMARY OF THE INVENTION

According to the present invention, this object is achieved by means of an arrangement which is of the type stated in the introduction to this specification and which is characterised in that the enclosure is located underneath the floor of the spray booth, that the part of the enclosure which is first contacted by the ventilation air is formed as a sloping plane being poured over with liquid, the lower end of the sloping plane being connected to said means forming a part of said enclosure and being poured over with liquid, and that the enclosure is so designed that the ventilation air is caused to be deflected through an angle of 10°-170° in relation to its substantially vertical direction of flow through the spray booth before being caused to pass through the above-mentioned means.

Said angle is preferably about 90°.

Preferably, the sloping plane is adapted to be poured over by the overflow of water from a reservoir located upstream of the enclosure.

Said means preferably comprise a perforated plate.

The electrostatic precipitator preferably contains at least one discharge electrode acting as ion source, and at least one stationary, gas-permeable collecting electrode onto which liquid is sprayed and which is disposed transversely of the direction of flow of the ventilation air through the electrostatic precipitator.

The discharge electrode is preferably designed as a row of wires or sheet-metal strips extending substantially parallel to the collecting electrode.

Preferably, a field or control electrode having a potential not exceeding the potential of said discharge electrode is disposed downstream of said collecting electrode.

The discharge electrode and the field electrode may have the same potential, which preferably is in the range of −100−−10 kV, especially about −20 kV.

The field electrode is preferably designed as a row of thin-walled tubes extending parallel to the collecting electrode.

BRIEF DESCRIPTION OF THE DRAWING

The invention will be described in more detail hereinbelow with reference to the accompanying drawing which is a vertical section of a painting unit comprising a spray booth and an arrangement according to the invention for cleaning ventilation air coming from the spray booth and polluted with tacky paint particles.

DESCRIPTION OF THE PREFERRED EMBODIMENTS

The painting unit shown in the drawing thus comprises a spray booth 1 through which car bodies 2 are advanced while being sprayed with paint. The paint is applied either by means of robots or human beings. In the latter case, it is possible to recycle the ventilation air only if the solvent vapours absorbed in the spray booth have previously been removed from the ventilation air.

The car bodies 2 rest on a conveyor 3 which travels through the spray booth 1 immediately above the floor grating 4 thereof. Below the floor grating 4, the spray booth passes into a duct 5 in which two electrostatic precipitators 6 operating according to the wet separation method are provided. Since these precipitators are identical, only one is shown in the drawing.

The precipitators are each disposed in an enclosure 7 designed as a sheet-metal box with a sloping, removable top. These enclosures are so disposed in the duct 5 at the outer walls thereof that the duct is defined in a manner to cause the ventilation air to flow through a conical duct cross-section which opens into an inner duct 8 having a smaller cross-sectional area. As further appears from the Figure, the side of each enclosure facing the inner duct consists of a perforated plate 9 having circular or slot-shaped openings of a diameter and length, respectively, of 5-10 mm. The plates have a degree of perforation of about 80%. Further, the plates are so mounted in the enclosures that their inclination can be varied with respect to the vertical plane. This arrangement facilitates the formation of a properly covering film of water along the upstream portions of the plates 9.

A reservoir 10 is provided at the upper end of the top of each enclosure for pouring water over the top and the perforated plate 9. The reservoir is connected through a conduit 11 to a water tank 12 in turn communicating with the bottom of the inner duct 8 through a drain pipe 13.

The electrostatic precipitators mounted in the enclosures consist of collecting electrodes 14 fixed to the enclosures, and discharge and field electrodes 15 and 16, respectively. The collecting electrodes consist of perforated plates of the same type as the perforated plates 9 while the discharge electrodes are designed as rows of wire coils (cf. drawing) or sheet-metal strips extending parallel to the collecting electrodes, said strips having tip portions oriented in the direction of flow of the ventilation air. The field electrodes are however designed as rows of thin-walled tubes extending parallel to the collecting electrodes and having a diameter considerably exceeding the wire diameter of the wire coils of the discharge electrodes or the tip portions of the discharge electrodes. The rows of discharge and field electrodes are secured to a frame structure (not shown) by means of insulators provided in the sides of the enclosures.

One discharge electrode 15 and one field electrode 16 are disposed upstream and downstream, respectively, of each collecting electrode. As appears from the Figure, each precipitator 6 includes four collecting electrodes and, thus, four discharge and four field electrodes. The discharge electrodes 15 and the field electrodes 16 are electrically interconnected and connected to the negative pole of a direct voltage source 17. The positive pole of the direct voltage source is connected to the collecting electrodes via the enclosures and to ground. The discharge electrodes and the field electrodes have a potential of e.g. −20 kV. Since the discharge electrodes and the field electrodes also are located at the same distance from the collecting electrodes, the resulting mean field strength is equal on both sides of the collecting electrodes.

This configuration is of course not the only conceivable one, but the number and the positions of the collecting, discharge and field electrodes may be varied in several ways. For instance, all discharge electrodes, except the first, in each electrostatic precipitator can be exchanged in certain applications for field electrodes in order to reduce the consumption of electric energy.

As further seen in the drawing, each of the electrostatic precipitators 6 is provided with nozzles 18 and 19 of flat and conical jet type, respectively, located above and opposite, respectively, the collecting electrodes 14. The nozzles are connected via tubular lances (not shown) and a number of conduits 20, 21 and 22 to a water tank 23 in turn communicating with the bottom of the enclosure 7 through a number of drain pipes 24.

A droplet separator 25 of the mesh or wave plate type is disposed downstream of each precipitator 6 to prevent water from collecting in a succeeding duct system for recycling the major part of the ventilation air to the upper part of the spray booth 1. The remaining part of the ventilation air is emitted into the atmosphere, e.g. through an incinerator for burning the solvent vapours of the ventilation air. If the paint should be applied manually, it is necessary to conduct the ventilation air through a concentrator for solvent vapours before recycling it to the spray booth, in order to reduce the solvent content in the spray booth to a level acceptable to man.

One or more textile barrier filters may be provided downstream of each of the droplet separators 25 to provide efficient separation of paint particles also in the absence of current supply to the direct voltage source 17 or because of any other electric failure in the precipitator.

The operation of the painting plant will be described in more detail hereinbelow with reference to the drawing. Ventilation air flows into the upper part of the spray booth and, when passing therethrough, is polluted with paint particles that have not adhered to the car bodies 2 during the painting operation. By the under pressure produced by fans 26 in the duct system, the air is then sucked downwards through the floor 4 of the spray booth onto the sloping tops of the enclosures 7. The air then flows further downwards through the inner duct 8 and into the enclosures 7 via the openings in the perforated plates 9 being poured over with water. The air is thus deflected through about 90° from a vertical to a horizontal direction of flow.

Part of the paint particles in the ventilation air will impinge on and be intercepted by the droplets of overflowing water. These paint particles will be conveyed by the water to the water tank 12 where they are separated from the water in customary manner by the addition of different chemicals, whereupon the paint slurry formed is allowed to settle in a settling tank (not shown). This water is supplied, inter alia, with a detackifier to prevent the separated paint particles from adhering to the outer surfaces of the enclosures or the drain pipe 13 and the water tank 12 and to facilitate handling the residual product.

In each precipitator 6, the remaining paint particles of the ventilation air are charged by electrons emitted from the wire coils of the first discharge electrode 15 or ions formed thereby, and are then conveyed by the ventilation air and the electric field produced between this discharge electrode and the first collecting electrode 14, onto the front face of the collecting electrode. Part of the paint particles that are not caught by the collecting electrode but flow through the perforations thereof into the space between the collecting electrode and the first field electrode 16 will be conveyed back onto the rear face of the collecting electrode by the electric field produced between the collecting electrode and this field electrode, in a direction opposite to the direction of flow of the ventilation air. The paint particles which are not caught by the first collecting electrode will be caught by the second, the third or the fourth collecting electrode operating in the same manner as the first collecting electrode.

When the ventilation air has passed through the electrostatic precipitators 6 and the droplet separators 25, practically no paint particles and water droplets remain in the ventilation air, which can be recycled directly to the spray booth via the exhaust air duct system without having to pass through additional particle or droplet separator means.

The collecting electrodes 14 are continuously sprayed with water from the nozzles 18 and 19, whereby to form a vertical movable film of water along the front and rear faces of the collecting electrodes for removing paint particles adhering thereto. The paint particles which adhere to the discharge and field electrodes are removed by means of recoiling water droplets and water sprayed from the lower nozzles 19. The paint particles are then conveyed by the water to the water tank 23, whereupon the paint slurry formed is allowed to settle in a settling tank (not shown). This water is not supplied with any detackifier since a certain detackifying effect on the separated paint particles is automatically achieved in the electrostatic precipitators. By separating the water flow in the duct 5 from the water flowing through the enclosures 7, the consumption of detackifier is thus reduced.

The invention is of course not restricted to the embodiment described above, but may be modified in different ways within the scope of the accompanying claims.

Instead of mounting gas-permeable collecting electrodes 14 transversely of the direction of flow of the ventilation air through the enclosures 7, it is possible to mount impermeable collecting electrodes parallel to this direction of flow.

Instead of using removable tops on the enclosures 7, it is possible to provide inspection and service doors in the enclosure sides.

Instead of disposing two enclosures, each having an electrostatic precipitator, underneath the spray booth 1, it is possible to use a single enclosure extending below the entire spray booth and having one electrostatic precipitator.

Finally, the collecting electrodes 14 may consist of a netting or grating instead of perforated plates.

We claim:

1. Arrangement for cleaning ventilation air coming from a spray painting booth and polluted with paint particles, the ventilation air flowing substantially vertically through the spray booth, said arrangement comprising means for contacting the ventilation air with a liquid flow for separating part of the paint particles of the ventilation air, there being provided downstream of said contacting means at least one electrostatic precipitator provided in an enclosure for separating the remaining particles as well as liquid droplets contained in the ventilation air and originating from said liquid flow, wherein the enclosure is located underneath a floor of the spray booth, the enclosure comprising a sloping surface which is first contacted by the ventilation air and means for pouring a liquid over the sloping surface and said contacting means, the sloping surface being poured over with liquid, the sloping surface having a lower end, the lower end of the sloping surface being connected to said contacting means forming a part of said enclosure and being poured over with liquid, and the enclosure being configured for causing the ventilation air to be deflected through an angle of 10°–170° in relation to its substantially vertical direction of flow through the spray booth before being caused to pass through said contacting means.

2. Arrangement as claimed in claim 1, wherein said contacting means comprise a perforated plate.

3. Arrangement as claimed in claim 2, wherein said angle is about 90°.

4. Arrangement as claimed in claim 3, wherein:
   said means for pouring a liquid over the sloping surface and said contacting means comprises a reservoir located upstream of said enclosure; and
   the sloping surface is configured for being poured over by the overflow of water from the reservoir located upstream of said enclosure.

5. Arrangement as claimed in claim 2, wherein the electrostatic precipitator contains:
   at least one discharge electrode comprising an ion source;
   at least one stationary, gas-permeable collecting electrode disposed transversely of the direction of flow of the ventilation air through the electrostatic precipitator; and
   means for spraying a liquid onto the at least one stationary, gas-permeable collecting electrode.

6. Arrangement as claimed in claim 5, wherein the discharge electrode has a potential and comprises a row of wires or sheet-metal strips extending substantially parallel to the collecting electrode.

7. Arrangement as claimed in claim 6, wherein the electrostatic precipitator further comprises a field electrode, the field electrode having a potential not exceeding that of the discharge electrode, and the field electrode being disposed downstream of the collecting electrode.

8. Arrangement as claimed in claim 7, wherein the discharge electrode and the field electrode have the same potential, which is in the range of $-100$ to $-10$ kV.

9. Arrangement as claimed in claim 8, wherein:
the potential of the discharge electrode and the field electrode is about $-20$ kV; and
the field electrode comprises a row of thin-walled tubes extending parallel to the collecting electrode.

10. Arrangement as claimed in claim 7, wherein the field electrode comprises a row of thin-walled tubes extending parallel to the collecting electrode.

11. Arrangement as claimed in claim 1, wherein:
said means for pouring a liquid over the sloping surface and said contacting means comprises a reservoir located upstream of said enclosure; and
the sloping surface is configured for being poured over by the overflow of water from the reservoir located upstream of said enclosure.

12. Arrangement as claimed in claim 11, wherein said contacting means comprise a perforated plate.

13. Arrangement as claimed in claim 1, wherein:
said means for pouring a liquid over the sloping surface and said contacting means comprises a reservoir located upstream of said enclosure;
the sloping surface is configured for being poured over by the overflow of water from the reservoir located upstream of said enclosure;
said arrangement comprises a fire and explosion-proof arrangement; and
said electrostatic precipitator is disposed in said enclosure having liquid flowing thereover to minimize fires and explosions from said electrostatic precipitator.

14. A fire and explosion proof arrangement for cleaning ventilation air containing pollutants, the ventilation air for removing the pollutants from a first chamber to be ventilated, the arrangement comprising:
means for moving the polluted ventilation air through the cleaning arrangement;
means for contacting the polluted ventilation air with a liquid flow to remove at least a first portion of pollutants from the ventilation air; and
electrostatic separator means for removing an additional portion of pollutants from the ventilation air;
said means for contacting being disposed substantially adjacent the first chamber, and the means for contacting comprising:
at least a first surface disposed to allow a flow of liquid to flow over said first surface, the flow of liquid for removing at least a portion of the pollutants from the ventilation air upon contact of the polluted ventilation air with the flow of liquid thereby producing at least partially purified ventilation air;
said first surface comprising a plurality of openings therethrough to allow passage of the polluted ventilation air through the first surface and the flow of liquid; and
means for flowing the flow of liquid over said first surface; and
said at least a first surface comprises a surface of an enclosure means, the enclosure means for enclosing the electrostatic separator means, and the enclosure means for being located in a second chamber underneath the first chamber, the first chamber being separated from the second chamber by a floor having openings therethrough for passage of the polluted ventilation air from the first chamber to the second chamber;
said electrostatic separator means being disposed for receipt of the at least partially purified ventilation air passing from the means for contacting to remove the additional portion of pollutants from the partially purified ventilation air to produce substantially purified ventilation air; and
said electrostatic separator being disposed in said enclosure means having liquid flowing thereover to minimize fires and explosions from said electrostatic separator.

15. The arrangement according to claim 14, wherein said electrostatic separator means comprise a wet electrostatic precipitator, said set electrostatic precipitator comprising sprays of liquid for wetting the ventilation air.

16. The arrangement according to claim 15, wherein:
the polluted ventilation air flows substantially vertically from the first chamber into the second chamber; and
the means for contacting further comprise at least one additional surface disposed below and adjacent the floor, the flow of liquid passing over said additional surface to said first surface, the flow of liquid passing over said additional surface to directly contact the polluted ventilation air upon passage of the polluted ventilation air from the first chamber into the second chamber.

17. The arrangement according to claim 16, wherein the polluted ventilation air is deflected through an angle of 10°-170° in relation to its substantially vertical flow before passage through said first surface.

18. The arrangement according to claim 17, wherein the angle is about 90°.

19. The arrangement according to claim 18, further including a droplet separator for removing the liquid from the substantially purified air from the electrostatic precipitator; and wherein:
the liquid flowing over said means for contacting flows from a liquid reservoir disposed along a raised edge of said additional surface;
said first surface comprises a perforated plate having at least one of: circular and slot-shaped openings covering about 80% of the plate;
said electrostatic precipitator comprises at least a first discharge electrode and a second collecting electrode, the first discharge electrode comprising an ion source and the second collecting electrode comprising a gas-permeable collecting electrode disposed transverse to the flow of at least partially purified ventilation air passing through said first surface; and
said electrostatic precipitator further comprises a field electrode, said discharge electrode and said field electrode each having a potential, the potential of the field electrode does not exceed the potential of the discharge electrode, and the potential of the field electrode and the potential of the discharge electrode being in the range of $-100$ to $-10$ kV.

20. The arrangement according to claim 19, wherein:
the collecting electrode is sprayed with liquid;
the discharge electrode comprises a row of at least one of: wires and sheet metal strips disposed parallel to the collecting electrode;

the potential of the field electrode and the discharge electrode are about −20 kV;

the field electrode comprises a row of thin-walled tubes disposed parallel to the collecting electrodes;

the electrodes being arranged so that the flow of at least partially purified ventilation air passes by the electrodes in the following order: discharge electrode, collecting electrode, and field electrode;

the pollutant comprises paint particles from sprayed paint; and the liquid comprises water.

* * * * *